(No Model.) 2 Sheets—Sheet 2.

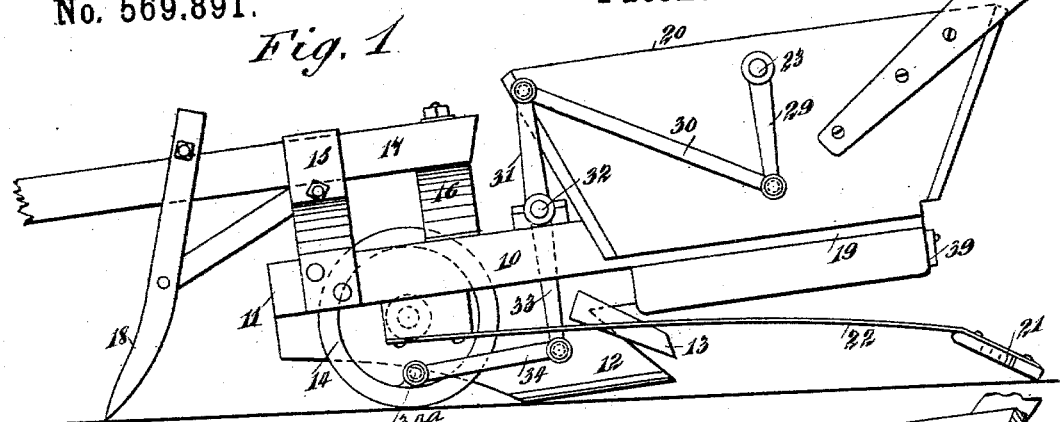
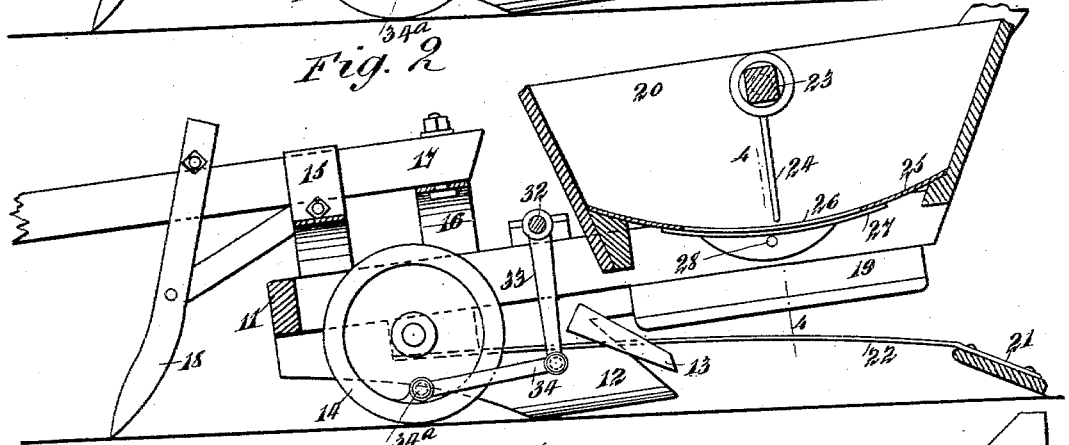
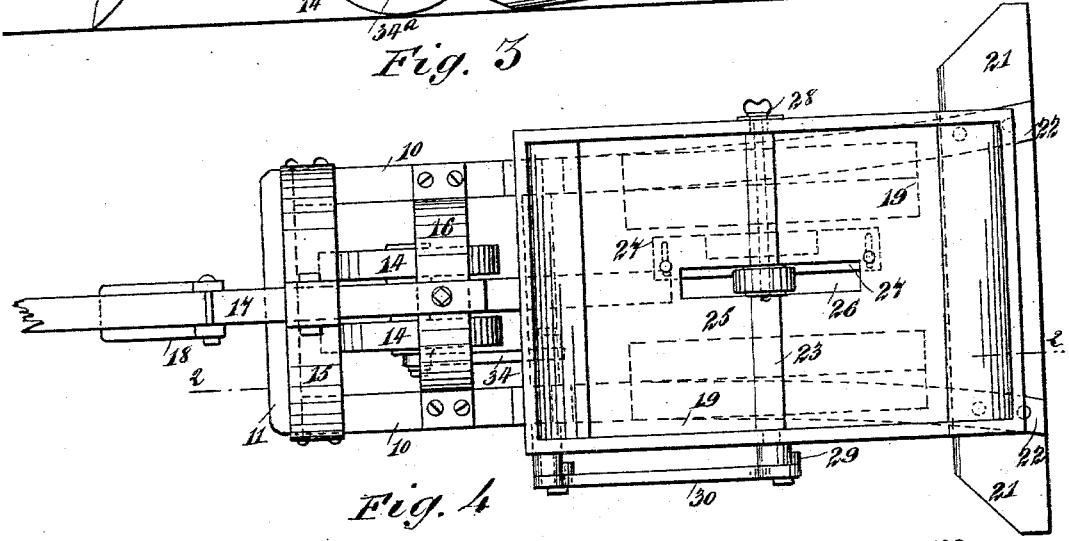
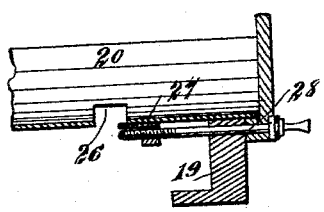

J. W. STANCIL.
PLANTER.

No. 569,891. Patented Oct. 20, 1896.

WITNESSES:
C. Neveux
Fred Acker

INVENTOR
J. W. Stancil
BY Munn & Co
ATTORNEYS.

UNITED STATES PATENT OFFICE.

JESSE W. STANCIL, OF FARMERVILLE, LOUISIANA.

PLANTER.

SPECIFICATION forming part of Letters Patent No. 569,891, dated October 20, 1896.

Application filed November 7, 1895. Serial No. 568,186. (No model.)

*To all whom it may concern:*

Be it known that I, JESSE W. STANCIL, of Farmerville, in the parish of Union and State of Louisiana, have invented a new and useful Improvement in Planters, of which the following is a full, clear, and exact description.

My invention relates especially to an improvement in planters adapted to be interchangeably employed for planting cotton or pea seed or seed of a similar character, and which may also be used for distributing fertilizer when desired.

The object of the invention is to provide a planter of the above character which will be exceedingly simple, durable, and economic and capable of attachment to any form of plow, and to provide a means whereby after the said furrow has been opened the furrow will be rendered more or less even or compact for the reception of the seed, the seed being covered by a drag after having been deposited in the furrow.

A further object of the invention is to so construct the planter that but comparatively few parts need be changed to convert the planter from a cotton-seed planter to a pea-planter or fertilizer-distributer.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 5:
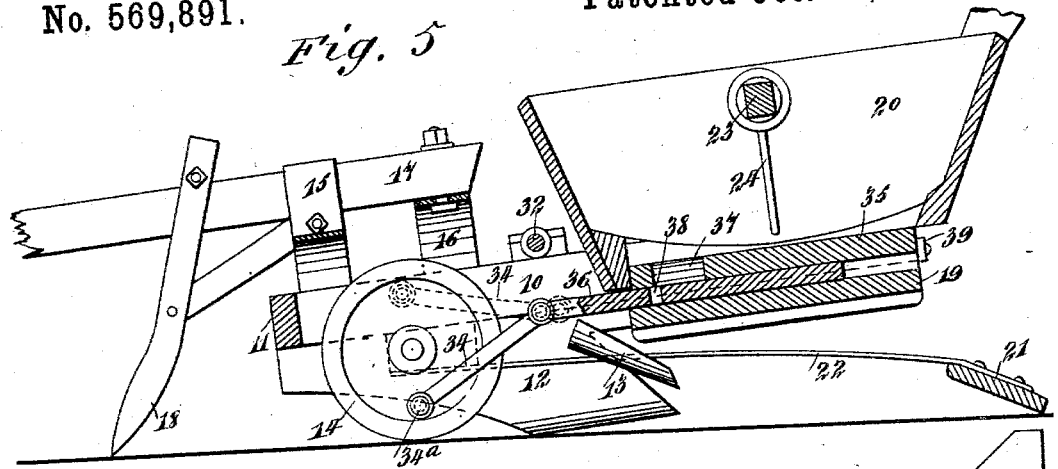
Figure 6:
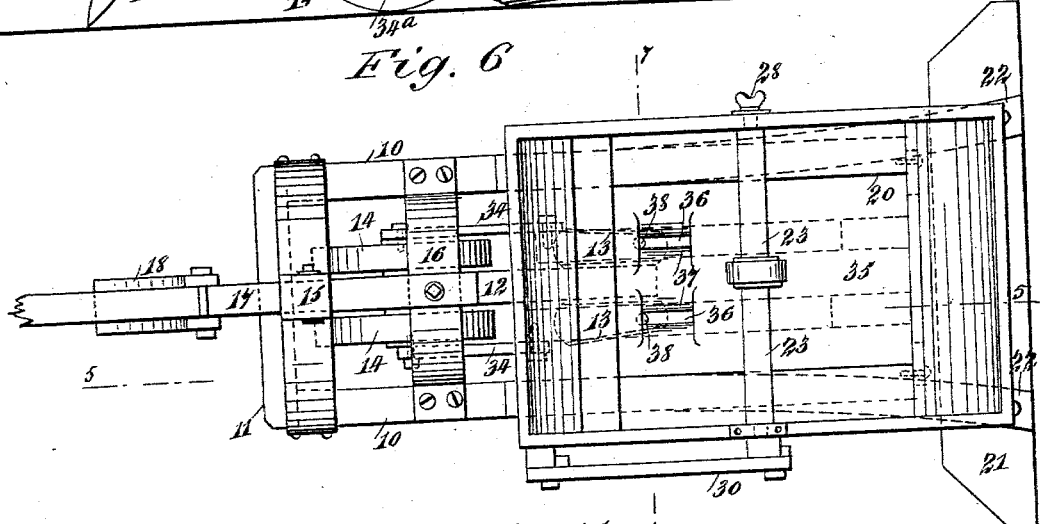
Figure 7:
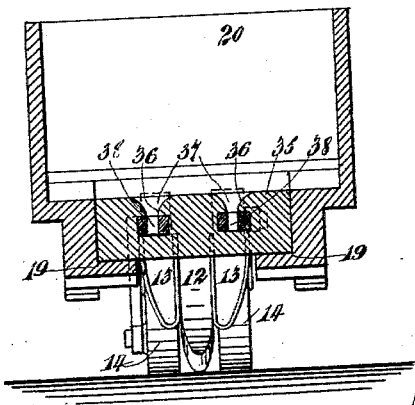

Figure 1 is a side elevation of the improved planter arranged for the planting of cotton-seed. Fig. 2 is a longitudinal vertical section through this form of planter, taken on the line 2 2 of Fig. 3. Fig. 3 is a plan view of the planter arranged for cotton-seed; and Fig. 4 is a detail sectional view through a portion of the hopper and a portion of the frame of the machine, the section being taken substantially on the line 4 4 of Fig. 2. Fig. 5 is a longitudinal vertical section taken through a planter arranged for dropping peas or for the distribution of fertilizing material, the said section being practically taken on the line 5 5 of Fig. 6. Fig. 6 is a plan view of the planter when arranged for the dropping of peas; and Fig. 7 is a vertical transverse section through this form of planter, the section being taken on the line 7 7 of Fig. 6.

In carrying out the invention the frame of the planter consists, preferably, of two side beams 10, connected at the front by a cross-bar 11, and provided at its front central portion with a smoothing-board 12, arranged longitudinally of the frame and adapted at the rear portion of its lower edge to enter a furrow and smooth the same preparatory to its reception of the seed, and this smoothing-board is provided upon each side with a downwardly and rearwardly extending seed-conducting chute 13, brought into action when the planter is used for dropping pea-seed or for distributing fertilizing material, the said chutes delivering the material at the rear of the smoothing-board 12.

At each side of the smoothing-board 12 a traction-wheel 14 is journaled, and on the top forward portion of the frame two yokes 15 and 16 are secured, the forward yoke being higher than the rear one, and the beam 17 of the plow to be used is passed beneath the forward yoke and over the rear one, being secured to the latter, and the attachment of the plow is so made that the share or furrow-opener 18 of the plow will be in longitudinal alinement with the smoothing-board 12.

At the rear portion of the frame a slideway 19 is constructed at each side, and above the aforesaid slideways a hopper 20 is secured to the frame in any suitable or approved manner, and a drag-board 21 is arranged transversely of the rear portion of the frame, being connected with its forward portion by arms 22, preferably of a spring character.

Transversely of the central portion of the hopper 20 a shaft 23 is journaled, and the said shaft is provided with any desired number of fingers 24, which radiate from it, the said fingers being particularly placed over the central portion of the hopper. When the machine is to be used for planting cotton-seed, a bottom 25 is located in the hopper, having a convexed lower and a concaved upper face, the bottom being removably secured in the said hopper, and it is provided with a longitudinal central slot 26, which may be partially or entirely closed by means of a slide 27, having guided movement on the under face of the said bottom, as shown in Figs.

2, 3, and 4, and this slide is usually manipulated through the medium of a thumb-screw 28, or its equivalent, extending out beyond one side of the hopper, as illustrated in Fig. 4.

A crank-arm 29 is secured to one outer end of the hopper-shaft 23, and this crank-arm is connected through the medium of a rod 30 with one end of a crank-arm 31, which is secured upon a shaft 32, journaled upon a frame in front of the hopper. This shaft 32 is provided with a second crank-arm 33, which, through the medium of a connecting-rod 34, is connected with a wrist-pin 34ª upon one of the traction-wheels 14 of the machine, as shown particularly in Figs. 1 and 2. Therefore in operation, the cotton-seed having been placed in the hopper, as the machine is drawn forward a furrow is opened in the ground. The furrow is smoothed by the smoothing-board 12, and the shaft 23 with its agitating-fingers will be oscillated by reason of the connection of said shaft with one of the traction-wheels, and the seed will therefore be fed through the opening 26 in the bottom of the hopper into the furrow in quantities regulated by the slide 27, and the seed is then covered up by the drag-board 21 at the rear of the machine.

When the machine is to be used for planting peas or other small seed or for the distribution of fertilizing material, the bottom 25 is removed from the hopper and its slide 27 is disconnected from the thumb or adjusting screw 28, and the connecting-rod 34 is disconnected from the crank-arm 33 of the shaft 32, and this latter arm is removed from the shaft. Otherwise the machine remains as when employed for the planting of cotton-seed.

Instead of the curved bottom 25, a bottom board 35 is slid in the slideways 19 beneath the hopper, forming the bottom of the same, as shown in Figs. 5, 6, and 7, and in this bottom board 35, preferably, two drop-slides 36 have longitudinal movement, the drop-slides extending beyond the forward end of the bottom board, and the bottom board is provided with openings 37, one of which is over the pocket 38 in each seed-drop slide. The forward ends of the drop-slides are then pivotally connected with the connecting-rods 34, pivotally connected to the traction-wheels 14, the connecting-rods of the two wheels being attached thereto at diametrically opposite points. Thus it will be observed that as the machine is drawn forward one slide will be taking seed while the other one is delivering the same, and the seed will be delivered in the chutes 13 and by them conducted to the furrow. When cotton-seed is being planted, attachment is made to but one of the aforesaid traction-wheels.

This machine is exceedingly simple. It is durable and economic in its construction, and may be readily changed to plant seed of any desired character or for the distribution of a fertilizing material. When the bottom board 35 is placed in position in the frame beneath the hopper, it is held in place by buttons 39 or their equivalents.

Having thus described my invention, I claim as new and desire to secure by Letters Patent—

1. In a planter, the combination with a frame, and wheels mounted in the forward part of the frame, of a beam secured to the front end of the frame, a furrow-opener secured to the beam in front of the frame, a hopper mounted on the rear end of the said frame, a seed-distributing device in the hopper, means for operating the distributing device from the driving-wheels, a smoothing-board secured to the front of the frame, and a delivery-chute secured to the smoothing-board, substantially as described.

2. In a planter, the combination with a frame, and wheels mounted in the forward part of the frame, of yokes secured to the forward part of the frame, a beam secured to the yokes, a furrow-opener secured to the beam, a hopper on the rear of the frame, a seed-distributing device in the hopper, means for operating the distributing device from the driving-wheels, a smoothing-board secured to the front of the frame, and a chute secured to each side of the smoothing-board, substantially as described.

3. In a planter, the combination with a wheel-supported frame having sliding ways formed in its rear portion, of a hopper on the said rear portion of the frame, and a board fitted to slide in the guideways of the frame and form a bottom for the hopper, said board being provided with drop-slides, substantially as described.

4. In a planter, a wheel-supported frame, a hopper located on the said frame, slideways formed in the frame, a removable closing-board adapted as a bottom for the hopper and fitted to slide in the said slideways, the said board having openings therein, seed-distributing slides having reciprocating movement in the said board, the pockets of the slides being adapted to cross the openings in the board, and a crank connection between the traction-wheels of the machine and the said slides, as and for the purpose set forth.

5. In a planter, a wheel-supported frame, a hopper located on the said frame, slideways formed in the frame, a closing-board adapted as a bottom for the hopper located in the said slideways, the said board having openings therein, seed-distributing slides having reciprocating movement in the said board, the pockets of the slides being adapted to cross the openings in the board, and a crank connection between the traction-wheels of the machine and the said slides, the crank connections between the slides and traction-wheels being at diagonally opposite points, a smoothing-board secured to the front of the frame, chutes secured to the smoothing-board and receiving the seed from the drop-slides and conducting them to the ground, and a drag adapted to close the furrow, as and for the purpose set forth.

6. In a planter, the combination, with a wheel-supported frame, a hopper secured on the said frame, a smoothing-board located below the hopper and adapted to travel in a furrow, the said board being between the traction-wheels of the machine, a chute located at each side of the rear end of the smoothing-board, a removable bottom for the hopper, provided with seed-drop slides and openings leading to the pockets of the same, the said drop-slides having crank connections with the traction-wheels, the connection of the two slides being at diametrically opposite points on the wheels, and a drag adapted to close the furrow, as and for the purpose set forth.

JESSE W. STANCIL.

Witnesses:
JULIUS ARENT,
JACOB HAAS.